US00RE45086E

(19) United States
(12) Reissued Patent
Coldewey

(10) Patent Number: US RE45,086 E
(45) Date of Reissued Patent: Aug. 19, 2014

(54) METHOD AND APPARATUS FOR PREFETCHING RECURSIVE DATA STRUCTURES

(75) Inventor: Dirk Coldewey, Santa Cruz, CA (US)

(73) Assignee: Paonessa Research, Limited Liability Company, Wilmington, DE (US)

(21) Appl. No.: 11/657,111

(22) Filed: Jan. 24, 2007

Related U.S. Patent Documents

Reissue of:
(64) Patent No.: 6,848,029
Issued: Jan. 25, 2005
Appl. No.: 09/755,754
Filed: Jan. 3, 2001

U.S. Applications:
(60) Provisional application No. 60/174,745, filed on Jan. 3, 2000, provisional application No. 60/174,292, filed on Jan. 3, 2000.

(51) Int. Cl.
*G06F 12/00* (2006.01)
*G06F 13/00* (2006.01)
*G06F 13/28* (2006.01)

(52) U.S. Cl.
USPC ..... 711/103; 711/154; 711/137; 711/204; 711/213

(58) Field of Classification Search
USPC ..... 711/154, 103
See application file for complete search history.

(56) References Cited

U.S. PATENT DOCUMENTS 5,305,389 A * 4/1994 Palmer ..... 382/305
5,305,424 A * 4/1994 Ma et al. ..... 706/52
5,317,727 A 5/1994 Tsuchida et al.
5,412,799 A 5/1995 Papadopoulos
5,414,704 A * 5/1995 Spinney ..... 370/389

(Continued)

OTHER PUBLICATIONS

Coldewey, Dirk, "Coping with Memory Latency," UCSC-CRL-97-06, University of California Santa Cruz, Jun. 1997.*

(Continued)

*Primary Examiner* — Sheng-Jen Tsai
(74) *Attorney, Agent, or Firm* — Dorsey & Whitney LLP

(57) ABSTRACT

[Computer systems are typically designed with multiple levels of memory hierarchy. Prefetching has been employed to overcome the latency of fetching data or instructions from or to memory. Prefetching works well for data structures with regular memory access patterns, but less so for data structures such as trees, hash tables, and other structures in which the datum that will be used is not known a priori. The present invention significantly] *A system and method is provided that* increases [the] cache hit rates of many important data structure traversals[, and thereby the potential throughput of the computer system and application in which it is employed]. [The invention] *This* is applicable to those data structure accesses in which the traversal path is dynamically determined. [The invention does this] *This is done* by aggregating traversal requests and then pipelining the traversal of aggregated requests on the data structure. Once enough traversal requests have been accumulated so that most of the memory latency can be hidden by prefetching the accumulated requests, the data structure is traversed by performing software pipelining on some or all of the accumulated requests. As requests are completed and retired from the set of requests that are being traversed, additional accumulated requests are added to that set. This process is repeated until either an upper threshold of processed requests or a lower threshold of residual accumulated requests has been reached. At that point, the traversal results may be processed.

34 Claims, 12 Drawing Sheets

AMENDED

(56) References Cited

U.S. PATENT DOCUMENTS

| | | | | |
|---|---|---|---|---|
| 5,704,053 | A | 12/1997 | Santhanam | |
| 5,793,994 | A * | 8/1998 | Mitchell et al. | 710/105 |
| 5,892,935 | A | 4/1999 | Adams | |
| 5,951,663 | A * | 9/1999 | Jayakumar et al. | 710/107 |
| 5,978,858 | A * | 11/1999 | Bonola et al. | 710/1 |
| 6,009,265 | A | 12/1999 | Huang et al. | |
| 6,014,655 | A | 1/2000 | Fujiwara et al. | |
| 6,047,338 | A * | 4/2000 | Grolemund | 710/33 |
| 6,105,119 | A * | 8/2000 | Kerr et al. | 711/219 |
| 6,154,826 | A | 11/2000 | Wulf et al. | |
| 6,237,079 | B1 * | 5/2001 | Stoney | 712/34 |
| 6,266,733 | B1 | 7/2001 | Knittel et al. | |
| 6,295,594 | B1 | 9/2001 | Meier | |
| 6,301,652 | B1 * | 10/2001 | Prosser et al. | 712/204 |
| 6,381,677 | B1 | 4/2002 | Beardsley et al. | |
| 6,393,026 | B1 * | 5/2002 | Irwin | 370/401 |
| 6,463,067 | B1 * | 10/2002 | Hebb et al. | 370/413 |
| 6,493,837 | B1 * | 12/2002 | Pang et al. | 714/45 |
| 6,502,157 | B1 * | 12/2002 | Batchelor et al. | 710/310 |
| 6,507,898 | B1 * | 1/2003 | Gibson et al. | 711/168 |
| 6,523,093 | B1 * | 2/2003 | Bogin et al. | 711/137 |
| 6,634,024 | B2 | 10/2003 | Tirumalai et al. | |
| 6,675,374 | B2 | 1/2004 | Pieper et al. | |
| 6,678,674 | B1 | 1/2004 | Saeki | |
| 6,701,324 | B1 | 3/2004 | Cochran et al. | |
| 6,717,576 | B1 | 4/2004 | Duluk, Jr. et al. | |
| 6,760,902 | B1 | 7/2004 | Ott | |
| 6,772,179 | B2 | 8/2004 | Chen et al. | |
| 6,801,209 | B1 * | 10/2004 | Chen et al. | 345/572 |
| 6,832,223 | B1 * | 12/2004 | Scheifler et al. | 1/1 |
| 6,848,029 | B2 | 1/2005 | Coldewey | |
| 6,868,414 | B2 | 3/2005 | Khanna et al. | |
| 6,928,520 | B2 | 8/2005 | McAllister et al. | |
| 7,028,297 | B2 | 4/2006 | Horn et al. | |
| 7,058,636 | B2 | 6/2006 | Coldewey | |
| 7,080,060 | B2 | 7/2006 | Sorrentino et al. | |
| 7,103,631 | B1 * | 9/2006 | van der Veen | 709/205 |
| 7,137,111 | B2 | 11/2006 | Damron et al. | |

OTHER PUBLICATIONS

Luk et al., "Compiler-Based Prefetching for Recursive Data Structures," University of Toronto, 1996.*

Karlsson et al., Effective Jump-Pointer Prefetching for Linked Data Structures, IEEE, 1999, pp. 111-121.*

Coldewey, Dirk, "Hiding Memory Latency Via Temporal Restructuring," Dissertations Abstracts International, vol. 5911B, p. 5930, 1998.*

McDowell et al., "Prefetching Linked Data Structures," Proceedings of the Seventeenth IASTED International Conference on Applied Informatics, pp. 512-515, 1999.*

Klaiber et al., "An Architecture for Software-Controlled Data Prefetching", Proceedings of the 18th International Symposium on Computer Architecture 1991, pp. 43-53.

Bjork, Russell C., "CS122 Lecture: Binary Trees", last revised Mar. 11, 1998, http://www.math-cs.gordon.edu/courses/cs122/lectures/bintrees.html, 1999, 6pgs.

Xia, Chun, "Optimizing Block Operations", Exploiting Multiprocessor Memory Hierarchies for Operating Systems, University of Illinois at Urbana Champaign, 1996, p. 87.

Lebeck, et al., "Request Combining in Multiprocessors with Arbitrary Interconnection Networks", IEEE Transactions on Parallel and Distributed Systems, vol. 5, Issue 11, Nov. 1994, pp. 1140-1155.

Hemalatha, et al., "Frequent Pattern Discovery Based on Co-occurrence Frequent Item Tree", Proceedings of 2005 International Conference on Intelligent Sensing and Information Processing, Jan. 4-7, 2005, pp. 348-354.

Cho, et al., "An Aggregation Technique for Traffic Monitoring", 2002 Symposium on Applications and the Internet (SAINT) Worships, Jan. 28-Feb. 1, 2002.

Kline, et al., "Computing Temporal Aggregates", Proceedings of the Eleventh International Conference on Data Engineering, Mar. 6-10, 1995, pp. 222-231.

Moon, et al., "Efficient Algorithms for Large-scale Temporal Aggregation", IEEE Transaction on Knowledge and Data Engineering, vol. 15, Issue 3, May-Jun. 2003, pp. 744-759.

* cited by examiner

AMENDED
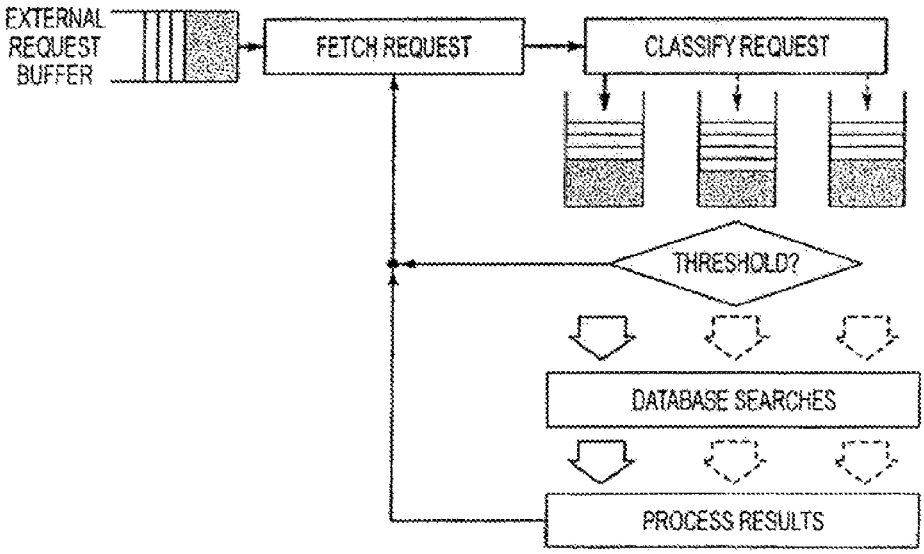
FIG. 2
AMENDED

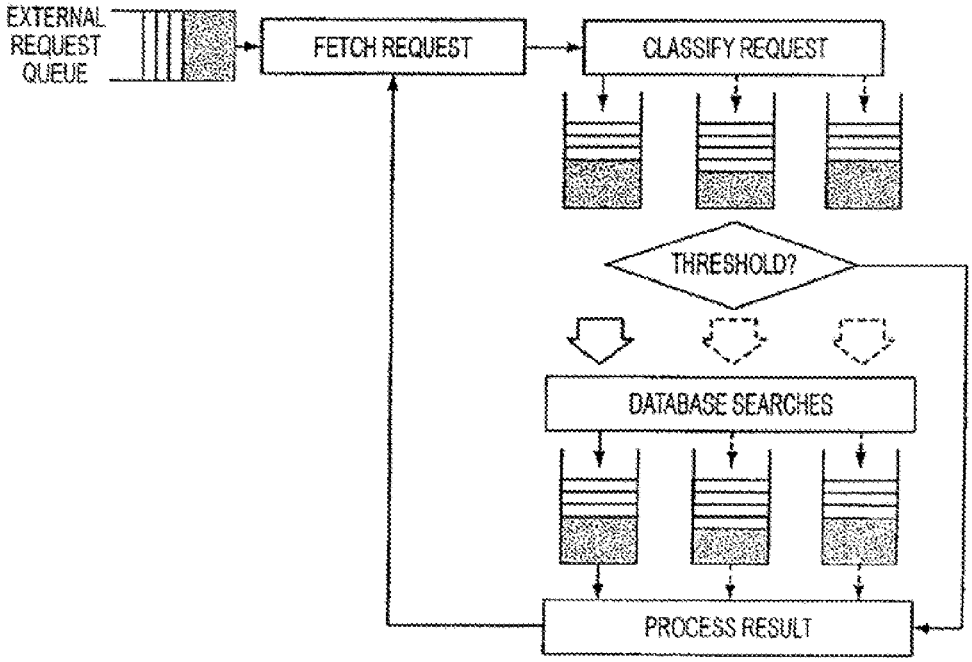
FIG. 3
AMENDED

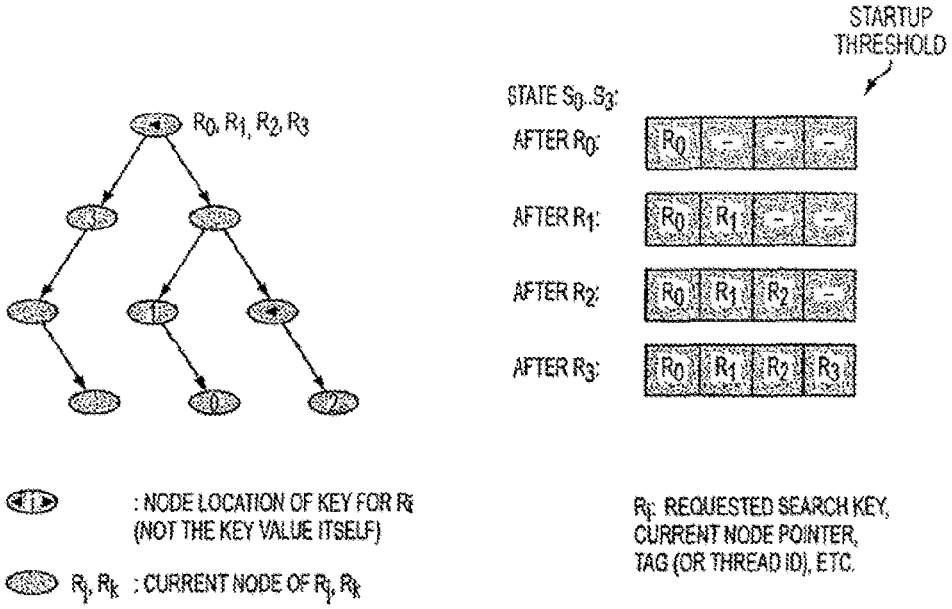
FIG. 4
AMENDED
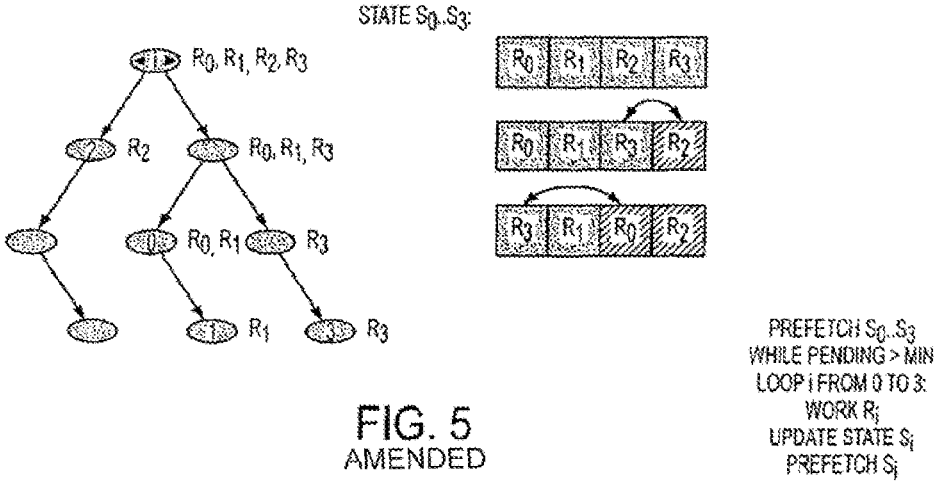
FIG. 5
AMENDED

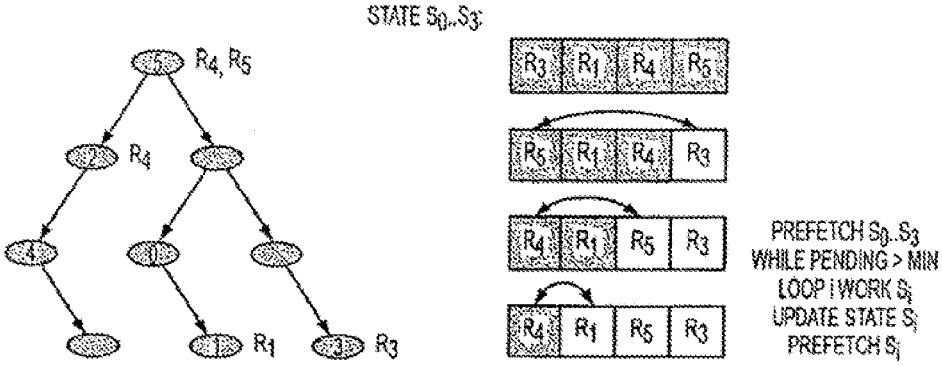
FIG. 6
AMENDED
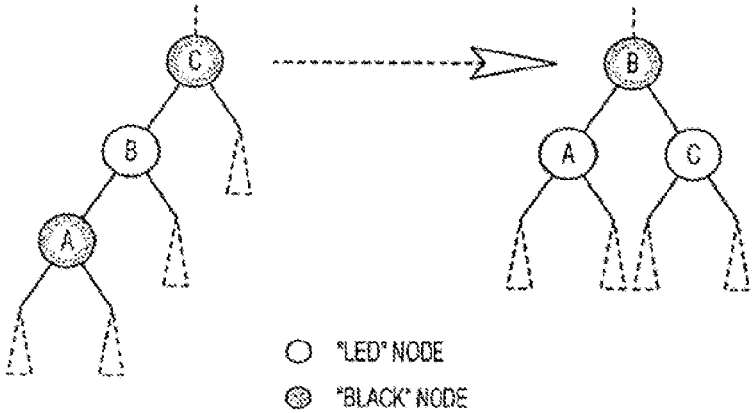
FIG. 7
AMENDED

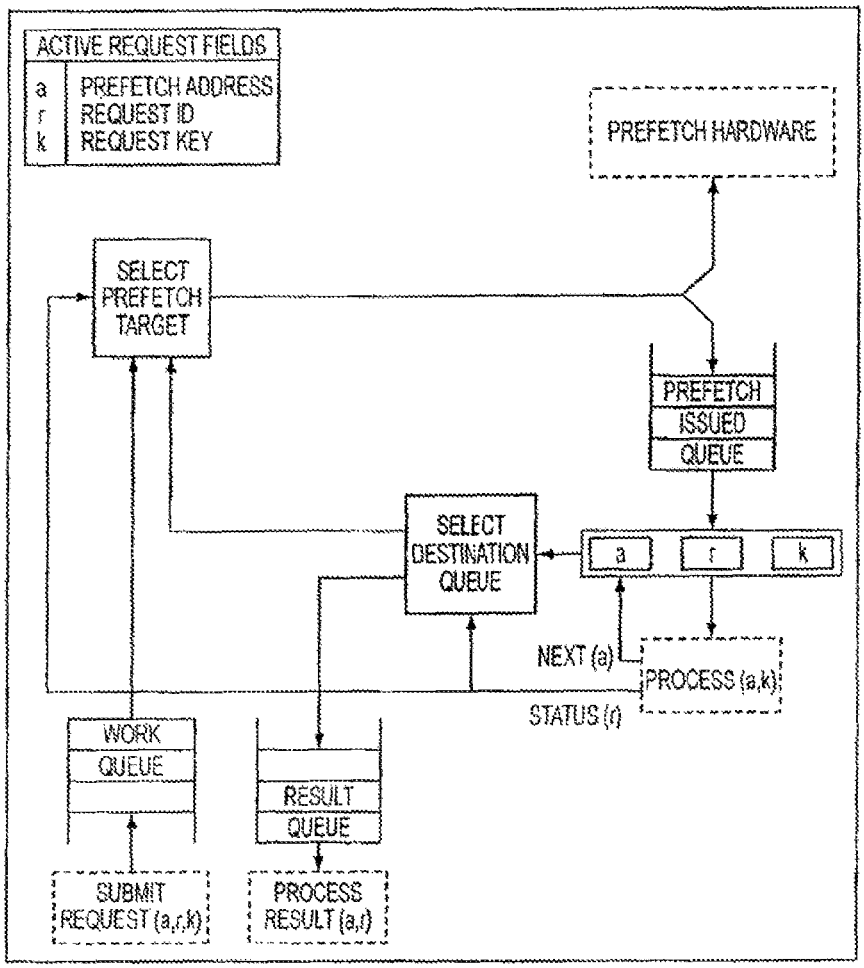
FIG. 8
AMENDED

```
RESTRUCTURED-TRAVERSAL( S, request )
begin
        AQ.enqueue( request );
        if AQ.size>K then
                SOFTWARE-PIPELINE( S, AQ, RQ );
        if RQ.size = 0 then
                return POSTPONE
        else
                return RQ.dequeue()
end
```

FIG. 9
AMENDED

```
TREE-DELAYED-SEARCH( lower )
begin
        integer i, prologue;

        prologue ←MIN(lower , RQ.size);
        i← 0;
        while i<prologue do
                PREFETCH( RQ.elem[ i ] );
                i ← i + 1;
        end while
        TREE-RECURSIVE-SEARCH( lower );
end
```

FIG. 10
AMENDED

```
TREE-RECURSIVE-SEARCH( lower )
begin
        i← 0;
        while i<AQ.size do
                request ←AQ.elem[ i ];
                k ←request.key;
                n ←request.node;
                if n = NIL or k = n.key then
                        AQ.delete( request );
                        RQ.enqueue( request );
                else
                        if k < n.key then request.node ← n.left;
                                else request.node ← n.right;
                        endif
                        PREFETCH( request.node );
                endif
                i ← i + 1;
        end while
        if AQ.size ≥ lower then TREE-RECURSIVE-SEARCH( lower ); endif
end
```

FIG. 11
AMENDED

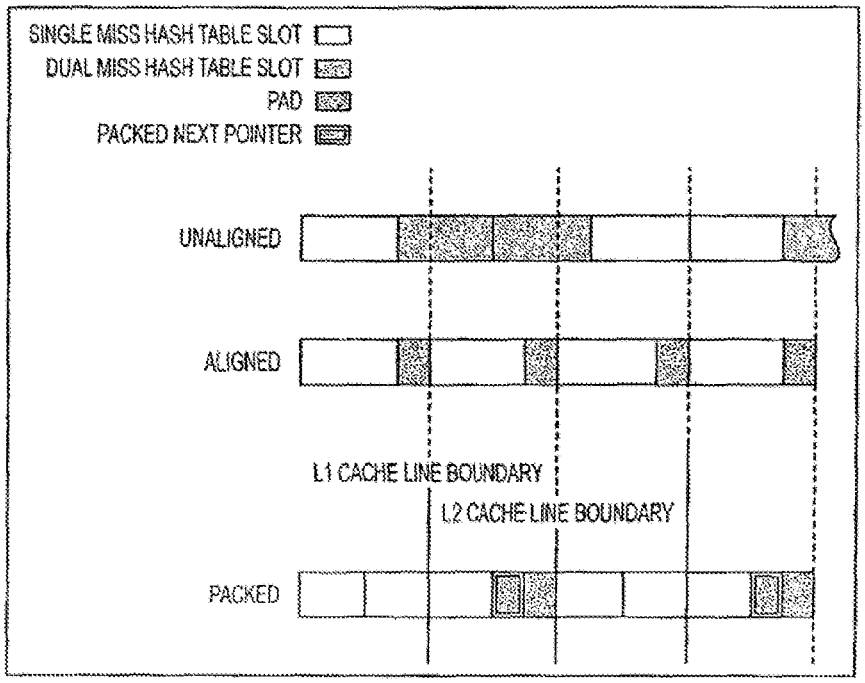
FIG. 12
AMENDED

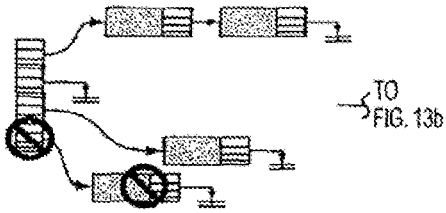
FIG. 13a
AMENDED
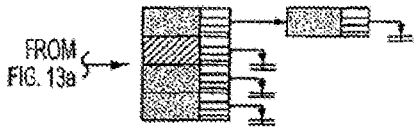
FIG. 13b
AMENDED
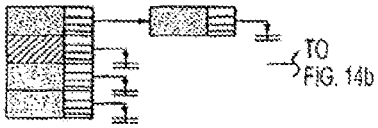
FIG. 14a
AMENDED
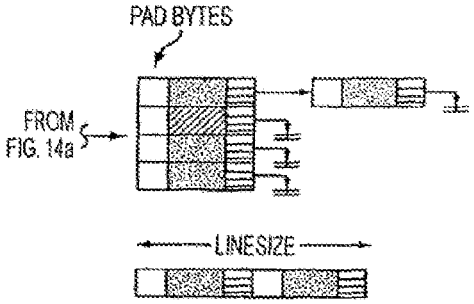
FIG. 14b
AMENDED

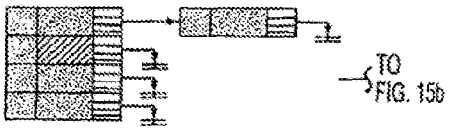
FIG. 15a
AMENDED
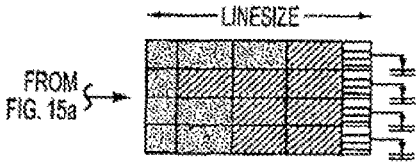
FIG. 15b
AMENDED
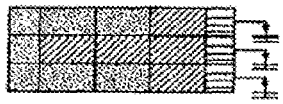
FIG. 15c
AMENDED
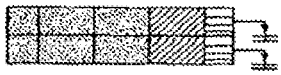
FIG. 15d
AMENDED
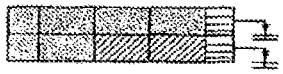
FIG. 15e
AMENDED

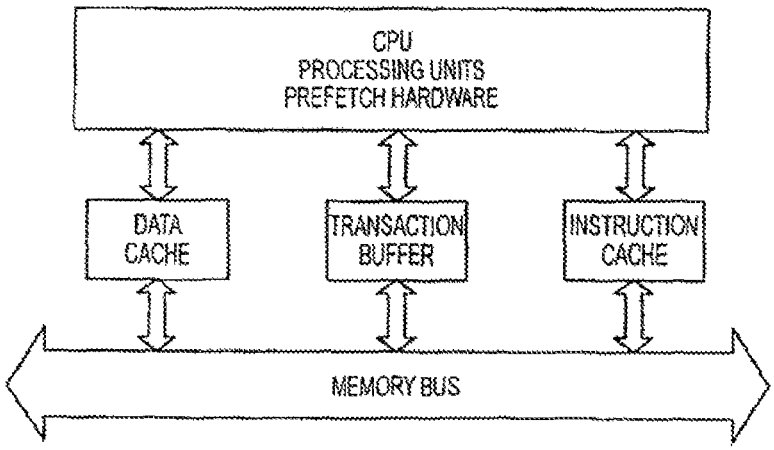
FIG. 16
AMENDED

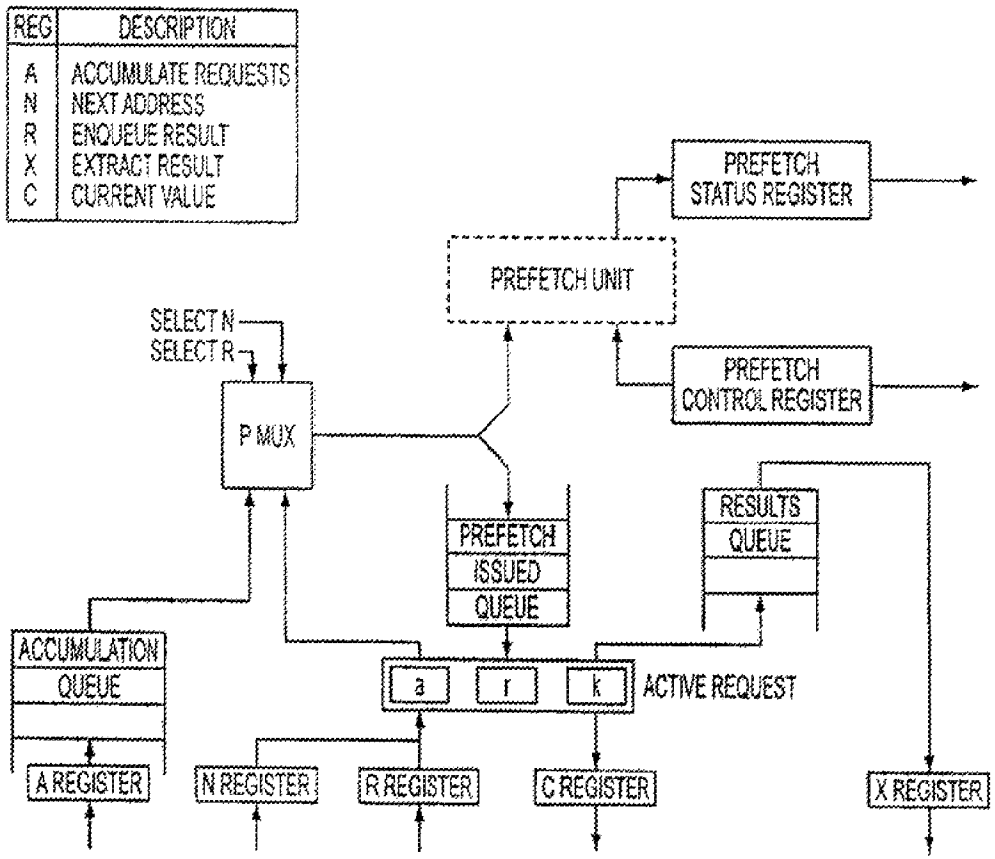
FIG. 17
AMENDED

METHOD AND APPARATUS FOR PREFETCHING RECURSIVE DATA STRUCTURES

Matter enclosed in heavy brackets [ ] appears in the original patent but forms no part of this reissue specification; matter printed in italics indicates the additions made by reissue.

This application claims benefit of Ser. No. 60/174,745 a provisional application filed Jan. 3, 2000 and claims benefit of provisional application Ser. No. 60/174,292 filed Jan. 3, 2000.

FIELD OF THE INVENTION

This invention addresses the problem of prefetching indirect memory references commonly found in applications employing pointer-based data structures such as trees and hash tables. More specifically, the invention relates to a method for pipelining transactions on these data structures in a way that makes it possible to employ data prefetching into high speed caches closer to the CPU from slow memory. It further specifies a means of scheduling prefetch operations on data so as to improve the throughput of the computer system by overlapping the prefetching of future memory references with the execution of previously cached data.

1. Background of the Invention

Modern microprocessors employ multiple levels of memory of varying speeds to reduce the latency of references to data stored in memory. Memories physically closer to the microprocessor typically operate at speeds much closer to that of the microprocessor, but are constrained in the amount of data they can store at any given point in time. Memories further from the processor tend to consist of large dynamic random access memory (DRAM) that can accommodate a large amount of data and instructions, but introduce an undesirable latency when the instructions or data cannot be found in the primary, secondary, or tertiary caches. Prior art has addressed this memory latency problem by prefetching data and/or instructions into the one or more of the cache memories through explicit or implicit prefetch operations. The prefetch operations do not stall the processor, but allow computation on other data to overlap with the transfer of the prefetch operand from other levels of the memory hierarchy. Prefetch operations require the compiler or the programmer to predict with some degree of accuracy which memory locations will be referenced in the future. For certain mathematical constructs such as arrays and matrices, these memory locations can be computed a priori, but the memory reference patterns of the traversals of certain data structures such as linked lists, trees, and hash tables are inherently unpredictable. In a binary tree data structure, for instance, the decision on whether a given traversal should continue down the left or right sub-tree of a given node may depend on the node itself.

In modern transaction processing systems, database servers, operating systems, and other commercial and engineering applications, information is frequently organized in hash tables and trees. These applications are naturally structured in the form of distinct requests that traverse these data structures, such as the search for records matching a particular social security number. If the index set of a database is maintained in a tree or other pointer-based data structure, lack of temporal and spatial locality results in a high probability that a miss will be incurred at each cache in the memory hierarchy.

Each cache miss causes the processor to stall while the referenced value is fetched from lower levels of the memory hierarchy. Because this is likely to be the case for a significant fraction of the nodes traversed in the data structure, processor utilization will be low.

The inability to reliably predict which node in a linked data structure will be traversed next sufficiently far in advance of such time as the node is used effectively renders prefetching impotent as a means of hiding memory latency in such applications. The invention allows compilers and/or programmers to predict memory references by buffering transactions on the data structures, and then performing multiple traversals simultaneously. By buffering transactions, pointers can be dereferenced in a pipelined manner, thereby making it possible to schedule prefetch operations in a consistent fashion.

2. Description of Prior Art

Multi-threading and multiple context processors have been described in prior art as a means of hiding memory latency in applications. The context of a thread typically consists of the value of its registers at a given point in time. The scheduling of threads can occur dynamically or via cycle-by-cycle interleaving. Neither approach has proven practical in modern microprocessor designs. Their usefulness is bounded by the context switch time (i.e. the amount of time required to drain the execution pipelines) and the number of contexts that can be supported in hardware. The higher the miss rate of an application, the more contexts must be supported in hardware. Similarly, the longer the memory latency, the more work must be performed by other threads in order to hide memory latency. The more time that expires before a stalled thread is scheduled to execute again, the greater the likelihood that one of the other threads has caused a future operand of the stalled thread to be evacuated from the cache, thereby increasing the miss rater, and so creating a vicious cycle.

Non-blocking loads are similar to software controlled prefetch operations, in that the programmer or compiler attempts to move the register load operation sufficiently far in advance of the first utilization of said register so as to hide a potential cache miss. Non-blocking loads bind a memory operand to a register early in the instruction stream. Early binding has the drawback that it is difficult to maintain program correctness in pointer based codes because loads cannot be moved ahead of a store unless it is certain that they are to different memory locations. Memory disambiguation is a difficult problem for compilers to solve, especially in pointer-based codes.

Prior art has addressed prefetching data structures with regular access patterns such as arrays and matrices. Prior attempts to prefetch linked data structures have been restricted to transactions on those data structures in which the traversal path is largely predictable, such as the traversal of a linked list or the post-order traversal of a tree. The invention described herein addresses the problem of prefetching in systems in which the traversal path is not known a priori, such as hash table lookup and tree search requests. Both of these traversals are frequently found in database applications, operating systems, engineering codes, and transaction processing systems.

SUMMARY OF THE INVENTION

The present invention significantly increases the cache hit rates of many important data structure traversals, and thereby the potential throughput of the computer system and application in which it is employed. The invention is applicable to those data structure accesses in which the traversal path is dynamically determined. The invention does this by aggregating traversal requests and then pipelining the traversal of aggregated requests on the data structure. Once enough traversal requests have been accumulated so that most of the memory latency can be hidden by prefetching the accumulated requests, the data structure is traversed by performing software pipelining on some or all of the accumulated requests. As requests are completed and retired from the set of requests that are being traversed, additional accumulated requests are added to that set. This process is repeated until either an upper threshold of processed requests or a lower threshold of residual accumulated requests has been reached. At that point, the traversal results may be processed.

BRIEF DESCRIPTION OF THE DRAWINGS

FIG. 2 is a high level representation of a transaction processing system that employs the invention in order to accumulate events that require traversal of the same type of data stucture. Events are buffered until a threshold has been reached, at which point software pipelined prefetching is performed across some or all of the accumulated events.

FIG. 3 illustrates an extension to the method of FIG. 2 by buffering the results of the event processing, in this case database searches, for subsequent simultaneous traversal.

FIG. 4 illustrates the event buffering process on a tree in which event processing is deferred until at least 4 search requests have been received. The state of the event buffer s is illustrated after each of the requests $R_0$, $R_1$, $R_2$, and $R_3$, have been received.

FIG. 5 illustrates the state of the system as the four search requests traverse the data structure. The state of the event buffer s is illustrated after matching keys for a search request have been found, first for $R_2$, and then $R_0$. Results are stored by swapping the satisfied request with the last unsatisfied event in the buffer. Once a completion threshold has been reached, in this case 2, the search is discontinued until the accumulated results have been processed.

FIG. 6 illustrates the state of the system after two additional requests, $R_4$, and $R_5$, have been buffered. The search continues as in FIG. 5, except that, this time, the number of nodes with matching search requests is allowed to go above the completion threshold. The matches may exceed the completion threshold because all requests for which a prefetch has been issued are allowed complete processing of the prefetched node, thereby preventing memory references from subsequent result processing, operating system activity, and other processes from displacing the prefetched data.

FIG. 7 illustrates the process of inserting a node into a Red-Black tree.

FIG. 8 shows the structure of a software implementation of the invention.

FIG. 9 illustrates the process of accumulating K requests on accumulation queue AQ for software pipelined traversals of data structure S, where K is the startup threshold. Accumulated results are returned from result queue RQ.

FIG. 10 shows a pseudo-code example of an initial call to a recursive binary tree search.

FIG. 11 provides a pseudo-code description of the recursive component of a pipelined search of a binary tree. The request is added to the result queue when the current node is NIL, indicating that a node with a matching key does not exist in the tree, or the key of the current node matches the requested key.

FIG. 12 shows memory alignment of hash table slots. The dark shaded areas of the unaligned hash slots indicate slots that have the potential to generate two misses; the light shaded slots miss at most once per reference. Packed slots are smaller because the pointers to the next hash table entry are eliminated from all but the last element in a packed slot.

[FIG. 13 shows] *FIGS. 13a-13b show* how heterogeneous hash table data structures [(a)] are represented as homogeneous structures [(b),] thereby eliminating at least one memory reference.

[FIG. 14 shows] *FIGS. 14a-14b show* how some potential cache misses in [(a)] can be eliminated by padding the data structure so that elements always fall on hash line boundaries [in (b)].

[FIG. 15] *FIGS. 15a-15e show* Hash table packing[. A] *through a* homogeneous hash table structure [(a) may be] represented as a packed structure [(b)], which can be rebalanced to make the table less sparse [as in (c), (d), (e), or others].

FIG. 16 illustrates the architecture of a Transaction Buffer, used to assist in accumulation and processing of traversal requests on a data structure.

FIG. 17 details the architecture of a Transaction Buffer with a single set of queues.

DETAILED DESCRIPTION

Figure 1:
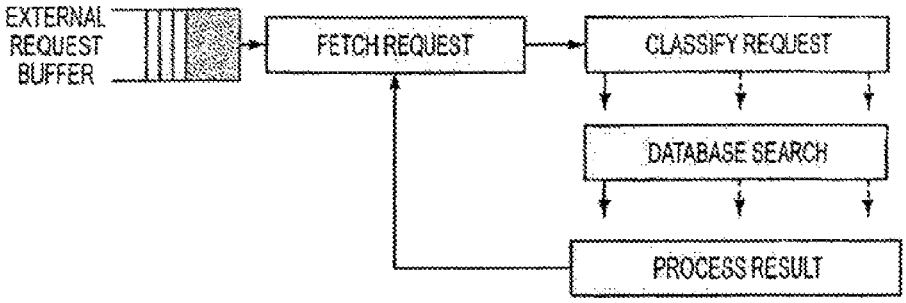
FIG. 1 PRIOR ART
FIG. 1 is a high level representation of a typical transaction processing system. As each request is received, actions are performed based on the event type.

Prefetching pointer-based data structures is much more difficult than prefetching data structures with regular access patterns. In order to prefetch array based data structures, Klaiber and Levy[1] proposed using software pipelining—a method of issuing a prefetch request during one loop iteration for a memory operand that would be used in a future iteration. For example, during loop iteration j in which an array X[j] is processed, a prefetch request is issued for the operand X[j+d], where d is the number of loop iterations required to hide the memory latency of a cache miss. The problem with this loop scheduling technique, prior to the introduction of this invention, is that it could not be applied to pointer-based data structures. A concurrently submitted application addresses this problem for data structures in which the traversal path is predefined, such as linked list traversal and post-order traversal of a tree. This invention addresses the problem for data structure traversals in which the traversal path is dynamically determined, such as in hash table lookup and binary tree search traversals. The application of the invention is then illustrated by means of binary search trees and hash table lookup.

[1] Klaiber and H. M. Levy, An Architecture for Software-Controlled Data Prefetching, Proceedings of the 18th International Symposium on Computer Architecture 1991, pp. 43-53.

The invention consists of the following method. Step 1 is to homogenize the data structure(s) to be traversed, where applicable. This process is described for open hash tables below and illustrated in FIG. 13, and can be applied to adjacency lists commonly used to represent graphs, and other data structures in order to remove an unnecessary level of indirection. Step 2 is to align the data structure on cache line boundaries, where applicable, as described below for hash tables and illustrated in FIG. 14. Alignment is performed for each element in the data structure, i.e. for each node of heap allocated storage in a linked list or tree. In an array, this may mean introducing pad space, such as is described for hash tables below. In heap allocated nodes, it may mean employing a special heap management interface that aligns blocks of memory on cache line boundaries. Step 3 packs data structures into cache line size components, where applicable, as described for hash tables below and in FIG. 15. The data structure traversal is constructed so that traversal is first performed over a group of data structures that have been packed together, and then over potentially multiple groups of packed structures. Step 3 is applicable primarily to nodes which exhibit temporal locality, such as nodes in a linked list (for instance, in an open hash table or adjacency list representation of a graph). Step 4 is to buffer events on a given data structure until a critical number of events has been reached, as described below for trees and hash tables, and as illustrated in FIGS. 2 through 4 and FIG. 9. The exact number of events to buffer can be determined via the compiler, experimentally, or a combination of both. Step 4 can be implemented by returning to the caller when the number of buffered requests is below a given threshold, unless immediate traversal is requested by another component of the system. Step 5 is to traverse the data structure for which the events have been buffered in a pipelined manner, issuing prefetch requests for some or all of the buffered events. Step 5 is illustrated for select examples in FIGS. 5, 6, 10, and 11 and is described for search tree traversals and hash tables below. The traversal results, such as when a node for which a matching key has been found, can either be processed immediately, or be stored in a buffer as well. The prefetch distance may be determined experimentally by the programmer, computed using prior art, or determined by the compiler. There are three parameters that control the traversal: a startup threshold, a completion threshold, and the pipeline depth. The startup threshold is the number of events that are buffered before traversal of the data structure or structures is allowed to commence. The completion threshold is the number of traversals that are completed (for example, when a matching key has been found) before no additional events are processed from the accumulated event buffer. Step 6 passes the results to the next stage in the surrounding system. The overall process is illustrated in FIG. 8. The buffers can be implemented in hardware or in software.

The data structures and traversal algorithms addressed in the concurrently submitted application have a common feature: only a single traversal path is taken through the data structure. Data dependencies may affect whether the path is taken to completion, which does not materially affect the choice of prefetch targets. The property that the path through a data structure is independent of the values of the nodes within the data structure makes it possible to modify the data structure so that the necessary parallelism to support software pipelining can be exposed. This condition does not hold for tree and hash table searches. In this application I discuss a method of aggregating temporally distributed data structure traversals in order to support software pipelined prefetching, which I refer to as temporal restructuring.

TABLE 1

| definition of variables | |
|---|---|
| d | Prefetch distance |
| l | Prefetch latency |
| n | Node on a traversal path. |
| $n_r$ | Root or startup node |
| $n_t$ | Termination node of traversal |
| K | Startup threshold |
| P | Pipeline depth |
| Z | Completion threshold |
| AQ | Accumulation buffer |
| IQ | Prefetch issued buffer |
| RQ | Result buffer |
| R | Request <k, r, a> |
| k | Search key |

TABLE 1-continued

| definition of variables | |
|---|---|
| a | Node address |
| r | Request id |

Search paths through a tree are not generally predictable. Consider a path P from the root node $n_r$ to a termination node $n_t$, $P=n_r, n_l, \ldots, n_t$. In the case of a binary search tree, the value of $n_i$ depends on the value of the key field of $n_{i-1}$.

If both the left and right node of a tree are always prefetched, then one prefetch target will usually have been prefetched in vain. Prefetching can only be effective if the prefetch address is identifiable far enough in advance so that it can be prefetched into near memory by the time it is first referenced. Thus even if both children are prefetched, a single pass of the inner loop of the search below does not require enough cycles to hide any significant latency:

```
Node SEARCH(Tree tree, Key k)
begin
    Node n;
    n ← tree.root;
    while ( node != NULL) do
        if ( k = n.key ) then return n; endif
        if ( k < n.key ) then
            n ← n.left;
        else
            n ← n.right;
        endif
    end while
    return NIL;
end
```

Consequently, the ability to prefetch only the children of the current node is unlikely to provide sufficient computation between the time the prefetch is issued and the time it arrives. In general, software pipelining schedules prefetch operations $d \geq \lceil l/s \rceil$ loop iterations ahead in order to completely hide latency, where s is the execution time of the shortest path through the loop and l is the prefetch latency. If the prefetch distance d is small, and the tree has been mapped to an array, it may be possible to employ greedy prefetching of the entire sub-tree of depth d. I refer to this subtree at node $n_i$ as the prefetch subtree of $n_i$. For the root node, the entire subtree of $2^{d-1}$ nodes would have to be prefetched, of which all but d are prefetched in vain. For each of the subsequent p−d−1 nodes on the path, $2^{d-1}$ nodes are prefetched, resulting in $(p-d-1)\times 2^{d-1}-1$ extraneous prefetches. The last d−1 nodes on P correspond to the epilogue in traditional software pipelined prefetching, requiring no additional prefetch commands. These numbers may actually be optimistic, since they assume that the application can avoid prefetching the entire subtree of $2^{d-1}$ nodes at each node in the path, issuing prefetches only for the newly discovered $2^{d-1}$ leaf nodes of the prefetch subtree. It is obviously not desirable to prefetch up to $2^{d-1}$ nodes when only 1 is required at each node along the path.

While a single traversal of the tree does not provide sufficient opportunity to exploit software pipelining, I show how temporally scattered, independent search requests can be aggregated so that software pipelining can be applied across multiple requests. The premise behind the approach is that a single unit of work performed on a given data structure may not provide sufficient opportunity to hide the latency via software pipelining, so work is allowed to accumulate until a threshold is reached, or a request for immediate resumption forces work to proceed. I refer to this process of aggregating and collectively processing independent data structure traversals as temporal restructuring. FIG. 9 shows high-level pseudo-code for handling a traversal request. Postponement is implemented by returning the special token POSTPONE from the search routine, which can be considered a request to submit additional work. The software pipeline processes accumulated work, storing results in the queue RQ.

In an online transaction processing environment, for instance, multiple temporally proximate transactions can be grouped for simultaneous traversal of the data structure. The amount of time that any particular search can be postponed in a transaction processing system may be limited by system response time requirements. Since the number of search requests that must be accumulated in order to ensure a software pipeline depth adequate to effectively hide memory latency is relatively small (in the tens of requests), this should not be an issue in a high throughput system. A system with real-time constraints must be able to ensure completion even when the system is not very busy. Since the number of search requests can be adjusted dynamically, the startup threshold, K in FIG. 9, can be reduced to a single request. In general, systems can raise the threshold in order to improve throughput and lower it to improve system response time.

The general structure of the accumulation process is illustrated in FIG. 8. A search request consists of a transaction descriptor <k,r,$a_i$>, where k is the search key associated with the request data structure identifier r, and $a_i$ is the initial prefetch target address, such as the address of the root node of a search tree or the initial hash bucket in the bucket chain of a hash table. One or more prefetch descriptors are associated with each data structure. A prefetch descriptor stores the invariants among accumulated requests, characterizing the prefetch target by the pipeline depth D, the startup threshold K, the completion threshold Z, the number of bytes to prefetch at each request, and a small buffer for several words of application-defined data.

Search requests are accumulated in AQ, the accumulation queue. When the number of elements in the queue reaches the startup threshold, K, then D search requests are dequeued from the accumulation queue. The address portion of each request is submitted to the prefetch hardware along with the prefetch parameters from the prefetch descriptor, and the request is enqueued on the prefetch issued queue. This sequence of actions corresponds to the prologue of software-controlled prefetching.

The accumulation process for a binary search tree is illustrated in FIG. 4. In this example, D=2 and K=4. The accumulation queue is shown after the requests $R_0, \ldots, R_3$ have been submitted. Once $R_3$ has been submitted, the completion threshold is reached, and all four requests point at the root node. The application dequeues the active request, <k,r $a_c$>, from the prefetch issued queue and processes the data corresponding to the current address $a_c$. If the requested key matches the key at the current address, then the active request is enqueued on the result queue, and a prefetch is issued for the next request on the accumulation queue. This request is then added to the prefetch issued queue. If the keys do not match, then a prefetch is issued for the next address $a_n$ in the data structure (such as a child pointer). The new address $a_n$ replaces $a_c$ in the active request transaction descriptor, and the new transaction descriptor <k,r, $a_n$> is added to the prefetch issued queue.

When the application is ready to process a search result, it extracts a search result descriptor <k,r, $a_x$> from the result queue, where $a_x$ is the address of the node containing k. Applications that perform searches typically return a value of NIL to indicate that no matching key was found. Thus, when no matching key is found, $a_x$ can be set to NIL. The application can force the search to proceed, even when the number of accumulated search requests falls below K, by submitting a reserved completion descriptor for accumulation.

If the number of cycles that is required to process the result is small, it may make sense to process each result immediately, rather than adding it to the result queue for later processing. It is not generally desirable to process results right away, since result processing may increase the amount of time spent at a single beat of the software pipeline. Increasing the amount of processing spent at one beat increases the danger that previously prefetched memory locations will again be displaced from the cache. If processing the result requires any I/O, for instance, the processor is likely to suspend the current process and perform other work. It is quite possible that all outstanding prefetches will be overwritten in the cache before the process that issued them is scheduled to run again. In the worst case, it is scheduled to run in a different CPU[2].

[2] For example, Xia found that some operating system activity involves clearing large buffers, which invalidates a large number of cache entries.

Binary Search Trees

The method can be demonstrated by applying it to a binary tree search. In order for the technique to be applicable, multiple independent search requests must be available for processing. To provide a context for a set of search tree traversals, consider a generic processor-bound client/server application that processes account debit requests. A non-pipelined version is illustrated in high-level pseudo-code below: A request arrives at the server formatted as a query that includes routing information, a request type, a

```
GENERIC-SERVER( )
begin
    loop forever
        request ← GetNextRequest( );
        case request.type of
        DEBIT: begin
                FindAcct( request );
                display ← OtherWork( request );
                Reply( display );
            end
        OTHER: ...
        end case
    end loop
end Server
```

search key, and a pointer to an account-record that is used to hold the search result. This query data structure strongly associates the query result with the answer, making it easier to support multiple outstanding queries. A viable alternative implementation might have the search routine return a pointer to the caller. A prerequisite of temporal restructuring is the ability to strongly associate a request with a request result, so that downstream code can work on a different request than that submitted to the search routine. Rather than cluttering the examples with implementation details of the straightforward process of associating requests with results, the example starts with an implementation in which the search result is bound to the search request as a pre-existing condition. Thus, the server searches a database for an account record corresponding to the search key, and the account pointer is initially set to NIL. The application invokes a search routine FindAcct that traverses the index set organized as a tree. FindAcct updates the account pointer to the matching account record, if there is one, and NIL otherwise. Based on the account information, a response to the request is generated in other subsystems, indicated by the call to OtherWork. The response is returned to the client application via the call to Reply.

A version of the server that processes DEBIT requests in a pipelined manner is illustrated below:

```
PIPELINED-SERVER ( )
begin
    loop forever
        request ← CheckNextRequest( );
        case request.type of
        DEBIT: begin
                qPipeSubmit (WorkQ,request);
                result ← qPipeExtract (ResultQ);
                if result ≠ NIL then
                    display ← OtherWork (result);
                    Reply (display);
                endif
        OTHER: ...
        end case
    end loop
end
```

The search tree traversals in this version are performed as part of qPipeSubmit, but only once the number of requests in the pipeline has reached K. When fewer than K requests occupy the pipeline, no search requests are processed, and qPipeExtract returns the reserved address NONE_AVAILABLE. Otherwise, qPipeExtract returns the first request for which a search result is available.

In an online transaction processing (OLTP) environment, GetNextRequest is a blocking call, stalling the server thread or process until another request becomes available. CheckNextRequest is a modified version of GetNextRequest which returns a synthetic DEBIT request containing a completion descriptor that forces any pending accumulated requests to complete if the result queue is empty. If the result queue is not empty, the application extracts a completed request as before, albeit without enqueuing a new request. Thus the server stalls only when all accumulation queues and result queues are empty, which avoids delaying replies when the request arrival rate is low. Although the system would not achieve maximal efficiency unless the pipeline is filled, the decrease in the arrival rate indicates that the system is otherwise idle, and wasted cycles less precious. In an offline data processing environment, completion is forced after the last request has been submitted.

If all requested keys are represented in the tree, calls to qPipeSubmit simply return until the number of requests submitted to qPipeSubmit reaches K. Once K requests have accumulated, prefetches are submitted for the first D requests in the accumulation queue. Each time a prefetch is submitted, the corresponding request is removed from the accumulation queue and added to the prefetch issued queue. This sequence of events constitutes the prologue. Once the prologue has completed, the head of the prefetch issued queue is removed and the corresponding node is processed. If the keys of the request and the node match, then the node address is saved and the descriptor is added to the result queue. Otherwise, the current descriptor is updated with the appropriate child pointer. At this point, the implementor or compiler has several choices of prefetch strategies:

1. Prefetch the child pointer and add the current request to the end of the accumulation queue. This approach maximizes the prefetch distance, the available distance between the time the prefetch is issued and the corresponding request is again processed. Increasing the prefetch distance beyond the minimum needed to hide memory latency also increases the risk of additional cache conflicts.
2. Issue a prefetch for the next request on the accumulation queue and move that request to the end of the prefetch issued queue. Then move the current request to the end of the accumulation queue without prefetching its child pointer. This process ensures that each of the accumulated requests is processed in round-robin order. Note that round robin scheduling does not guarantee any particular completion order among accumulated requests, since search requests may complete at any point in the traversal of a tree.
3. Prefetch the child pointer and add the current request to the end of the prefetch issued queue, ensuring that requests are processed in approximately first come first served order. Each request remains in the prefetch issued queue until it completes, guaranteeing a larger percentage of processing time to queries that have reached the prefetched issued queue (1/p instead of 1/(p+a), where p is the number of elements in the prefetched issued queue and a is the number of elements in the accumulation queue). Once again, this approach does not guarantee a completion order. If the system has been appropriately tuned, the processing delay provided by the queue of length D should be sufficient to hide any memory latency.

The latter two options have similar interference and throughput characteristics. In any case, the head of the prefetch issued queue is removed to replace the current request, and the process repeats itself until no more requests occupy the prefetch issued queue.

If an address for which a prefetch request has been issued is referenced before it has arrived in the cache, the CPU stalls until the prefetch for the corresponding line completes. The cache hardware checks if there is an outstanding prefetch request for the line, in which case it does not issue a second request. Consequently, a reference to an address for which a prefetch is in progress incurs only a partial miss penalty. Cache misses always bypass pending prefetches in the reference system, so that a cache miss never has to wait for the prefetch issue queue to empty before it is submitted to the memory hierarchy. A prefetched address may be evicted before it is referenced for the first time, either by another prefetched cache line or by another data reference. In this case the CPU stalls until the corresponding line is brought into the cache through the normal cache miss mechanism, incurring the full miss penalty.

As the number of elements in the result queue increases to the point where fewer than D requests remain in the accumulation and prefetch issued queues, not enough work is left to hide the latency. Consider the point in the search process where all but a single search request has been resolved. The request is dequeued from the issued queue, it's node pointer updated, and a prefetch issued. It is added to the prefetch issued queue, and almost immediately dequeued again. A prefetch that goes all the way to memory is unlikely to have completed by the time this last search request has been dequeued again, causing the processor to stall.

To avert this problem, I employ a completion threshold Z. As long as the combined number of requests remaining in the issued queue and the accumulation queue remains above Z, a prefetch request is issued for the child pointer, and its descriptor is added to the end of the prefetch issued queue. Once the completion threshold Z has been reached, the current descriptor is added to the accumulation queue instead, without issuing a prefetch request. Inserting the descriptor at the head of the queue, instead of the tail allows search requests that have been waiting longest complete sooner. The remaining elements in the prefetch issued queue are then processed, so that the prefetch issued queue is empty by the time the application exits the epilogue. When there is little danger that the temporarily abandoned prefetch requests will be evicted before the corresponding search requests are resumed, then there is no need for an epilogue. This information is not generally predictable at compile time, and since the epilogue has only a moderate impact on the instruction cache footprint of the application, it is generally included. This process may bring the actual number of remaining requests below Z, since some of requests in the issued queue may move to the result queue. All other requests are available on the result queue, and will be dequeued and returned by repeated calls to the result extraction routine, qPipeExtract, until the result queue is empty. The PIPELINED-SERVER above shows qPipeExtract being used to process results from the software pipeline.

Intuitively, it would appear that D is a natural choice for the value of the completion threshold Z, with K some small multiple of D. Yet, in experiments where Z was varied from 0 to D and K was kept constant, a relative performance declined notably well before the completion threshold Z reached the pipeline depth D. This is a consequence of the fact that the amount of work performed per set of accumulated traversals decreases as Z approaches D. The amount of work performed each time traversal is triggered is a function of K-Z. For a fixed value of K, the amount of work performed at each traversal decreases as Z increases. If the amount of work performed with each traversal is decreased, then more traversals are required to accomplish the same total amount of work. For instance, if there are 1000 requests and D=22, Z=22, and K=32, then only 10 requests are completed per traversal, requiring 100 traversals. Part of the startup cost of each traversal is a function of D. Another portion of the startup cost is bringing the working set that is not prefetched, such as instructions that have been evicted between traversals, into cache. The startup overhead is incurred 100 times for 1000 requests. If Z is reduced to 12, then the startup cost is incurred only half as often, although each traversal will have to endure at least partial latency due to a partially empty software pipeline. The application effectively trades off some latency for a reduction in startup overhead.

Because search traversals of data structures typically perform very little work at each node, the optimal pipeline depth can be quite long. A tree search achieved optimal performance at a pipeline depth of 32, while the optimal pipeline depth for Quicksort was only four. Quicksort performs significantly more work per iteration. Response time constraints and interference effects may limit the practical size of the accumulation queue. If queue management is supported by hardware, hardware constraints will further curtail the total number of outstanding requests that can be accommodated.

The startup threshold used to begin a round of searching is adjusted so that most of the latency can be hidden most of the time without violating other system requirements such as service response time. For software-managed queues, an accumulation scheme that attempts to accumulate too many requests may also introduce self-interference, since the queues also increase the cache footprint of the application.

When the first round of searches is triggered, the node set will contain only pointers to the root of the tree. This will result in multiple prefetch instructions for the same node. The memory hierarchy keeps track of pending prefetch requests, ensuring that only one memory request is outstanding to the same cache line at any given time. Consequently, multiple prefetch requests to the root node do not generate additional memory traffic. After the initial cold start, a diverse set of partially completed requests will populate the set of nodes in the accumulation queue. Some of the search requests in the accumulation queue may be the result of a traversal that reached the completion threshold, and thus refer to arbitrary nodes within the tree. Maintaining this state may impose some restrictions on insertion of nodes into the tree and deletion of nodes from the tree, as is discussed below.

If program semantics allow search requests to intermingle with insertion and deletion requests, then software pipelining introduces some new timing issues, especially in the presence of completion thresholds. When node insertion and deletion are supported, then the fact that there may be search requests already in progress may impact the outcome of the searches. Consider a search tree undergoing insertion of a node with key $k_n$, and that key does not exist in the tree at the time of the insertion. There may be an outstanding search for $k_n$, invoked prior to the insertion. Had the request been processed immediately, it may have returned a NIL pointer. If insertion requests are processed concurrently with the search requests, then the insertion may complete before the outstanding search request for $k_n$ is processed. If the node is inserted at a leaf and the tree undergoes no other changes, then the next time the number of accumulated searches reaches the startup threshold, $k_n$ will find the freshly inserted node. In doing so, it will return a node that did not exist at the time the search request was first made. This clearly changes the semantics of the program. In some cases, this may be of no particular consequence. For instance, consider a banking system that allows creation of accounts on a live online transaction processing system. If the accounts are indexed by social security number via a tree, then it is very unlikely that a search request for an account will precede the creation of that account. Even if this unlikely event comes to pass, a positive outcome of a search is not necessarily regarded as an error. Since temporal structuring is aimed at hiding memory latency, the time spans can be measured in fractions of seconds—for applications involving human interfaces this is practically simultaneous.

For balanced binary tree schemes, where the table is modified with each insertion, it may be prudent to force completion of extant search requests. Consider the insertion of node A in FIG. 7. The resulting rotation moves node B to the root node. This means that all pending search requests pointing to C will never find B, since search requests always traverse downwards. The problem with deletion is more obvious, since a node that is pointed to by an accumulated search request for which processing is not complete, cannot be safely deleted without affecting the search operation. If any search request in the accumulation queue points to the deleted node, then the outcome is almost guaranteed to be a disaster if the memory occupied by the deleted node is reused for some entirely different purpose. Since deletions from the tree between search requests may invalidate accumulated search requests, either deletion can be postponed until all accumulated searches have completed, or pending search requests can be forced to complete prior to deletion.

Recursion

Recursion is often a natural way to express an algorithm. Recursive tree searches can be performed in a manner similar to the loop-based tree search described above. FIGS. 10 and 11 illustrate a recursive version of a search. The code shows the explicit management of the request and result queues to illustrate how a software-only approach can be employed. Once enough requests have been accumulated, the recursive search, TREE-DELAYED-SEARCH of FIG. 10 is called to execute the prologue. All requests recurse together. That is, each recursive call to TREE-RECURSE advances every pending request one node in the tree. The recursion is allowed to unravel once a sufficient number of search requests have been satisfied so that the number of outstanding search requests no longer meets the lower bound criterion on the software pipeline depth. The binary tree search in the example is tail-recursive, so that the state of the search requests does not need to be maintained on the stack. Consequently, allowing the recursion to unravel has no negative repercussions.

For applications that rely on maintaining the state of the stack variables from prior procedure invocations, allowing the recursion to unravel could prove more of a problem. In these cases, all searches in the pipeline can be allowed to complete, without regard for the completion threshold, and at the expense of more memory stalls.

A more general version of the tree traversal algorithm would have to place all nodes and keys onto the stack, considerably increasing the amount of stack space required to complete the search, and thus the data cache footprint of the application.

Hash Tables

Hash tables and other data structures with short pointer chains pose a particular challenge to prefetching. The problem is two-fold: short pointer chains do not provide much to prefetch, and the amount of work performed at each iteration in the process of prefetching them is negligible, therefore actually requiring a significant prefetch distance in order to hide memory latency. This patent includes several methods to cope with this problem.

The hash table data structure is modified so that, instead of storing a pointer to a list of hash buckets, each hash table slot contains the first bucket of each chain in the hash table directly. Empty entries are indicated by an invalid key. If there are no invalid keys, an empty entry can be indicated via a reserved address in the pointer to the next hash bucket. This optimization serves two purposes. First, it eliminates one unnecessary level of indirection by allowing the hash function to directly supply the address of the first bucket in the chain. Second, it has the effect of homogenizing prefetch targets. Homogeneous prefetch targets eliminate the need for separate code to prefetch the initial hash table entry. This has the effect of increasing the size of each hash table slot, which should only prove disadvantageous if there are a preponderance of empty hash table slots. If the hash table is fully populated, then I've actually reduced the memory requirements by the size of the hash table.

The homogenized hash table can be subjected to several locality optimizations. An obvious means of eliminating cache misses is to ensure that each hash bucket is aligned on a cache boundary. Hash buckets in the benchmarks that I used to evaluate the efficacy of the approach consist of a key, a pointer to the next element on the hash table, and a pointer to a data record, for a total of 12 bytes. If each L1 data cache line supports 16 bytes, half of the hash table slots will span two L1 cache lines, and every third hash table slot will span two 32 byte L2 cache lines, as illustrated in FIG. 13. The problem can be eliminated by padding each entry so that the subsequent array element is aligned on a cache line boundary. Hash buckets in the hash chain are similarly aligned. This approach does not require any fundamental change in the hash lookup code. Both prefetching and non-prefetching versions can expect to benefit from alignment.

Cache line sizes in modern microprocessors are 32 bytes or more in size for primary caches, and 64 bytes or more for secondary caches. Large line sizes are an invitation to pack more data into each cache line. Additional performance benefits can be derived by packing as much of a bucket chain into each cache line as possible. This approach appears attractive when the hash chains contain more than a single element. Note that long hash chains run contrary to the philosophy of hashing. Adjacency lists employed by many graph algorithms, on the other hand, may maintain an arbitrarily long list of references to adjacent nodes in the graph.

Alignment and homogenization help reduce the number of cache misses incurred in a hash table lookup. When a hash chain achieves any significant length, the hash chain can be packed into a buffer that fits into a cache line. The buffer is structured as an array of hash chain elements followed by a pointer to the next buffer. For a buffer containing n elements, the pointer to the next hash element can be eliminated for the first n−1 elements, allowing more hash chain entries to be accommodated in each buffer. A reserved key can be used to indicate the end of the array, or the pad word can be used to hold the number of valid hash chain entries in the array. The last word in the buffer is used to hold the address of the next buffer, allowing for the possibility that the length of the hash chain may exceed the number of elements that can be accommodated in a single buffer. In a sense, the implicit prefetch inherent to large cache lines is being employed for buckets that share a cache line. Explicit prefetching can be applied to prefetch each packed buffer, thereby increasing the likelihood that a cache line will be available if the number of collisions should exceed the capacity of a single packed hash line, with the added benefit that each prefetch operation can actually prefetch up to n hash chain elements.

The number of hash collisions per bucket can be expected to remain small under ordinary hashing conditions and given a good hash function. Aligned hash chains have the disadvantage that the minimum size of a hash chain is relatively large. A packed buffer for an 8 word cache line contains 3 entries of 2 words each for the example, in addition to a word of padding and a pointer to the next hash bucket. FIGS. 15(b) through 15(e) illustrate the configuration of a packed hash table. As few as one out of three hash chain entries may actually store hash elements when the number of collisions is small. Consequently, packing may lead to a fair amount of wasted memory, especially in a homogenized hash table. Based on the assumption that hash collisions are cheap if they fall onto the same cache line, I reduced the number of hash table slots for the packing transformation, modifying the hash function accordingly. While the number of collisions at each slot increases, the cost of resolving a collision decreases. If the average number of entries per hash slot is originally 1, then the only benefit afforded by the approach is a slight increase in the probability that a hash bucket may be reused across multiple instantiations. For the benchmarks, hash buckets were packed into an array, with each array aligned on an L2 cache line boundary.

Experimental results show that packed hashing afforded similar benefit to alignment. Packing improved hash lookup performance by 4% to 17%, while alignment, alone, improved hash lookup performance by 2% to 16% when the average hash chain contained a single element. This significant improvement indicates that hash elements that span multiple cache lines have a significant negative impact on hash lookup performance. When the average hash chain length increases to 1.5, alignment affords an 8% to 10% performance improvement. Temporal restructuring, when applied to hash tables without specialized hardware support, did not perform well, since the overhead is amortized over few memory references. Performance improved from 4% to 14%, depending on hash interference assumptions between requests. Combining alignment and prefetching did not significantly improve the performance, showing a 12% to 20% performance improvement over the non-prefetching implementation. Experiments showed that hardware buffers, as illustrated in FIG. 16, significantly improve the performance of the system beyond that of the original prefetch scheme.

Hardware Buffer

The mechanism for buffering transactions described thus far employ buffers allocated from general memory. System throughput can be significantly improved by providing this buffer in hardware, along with a few operations on the buffer.

FIG. 17 illustrates a hardware implementation of the temporal restructuring mechanism described in FIG. 9. The queues are implemented in hardware. Each queue is accessed via an independent device port or register. Ports are modeled as memory mapped devices, with a separate address for each field of a tuple. An internal 64-bit control register holds the prefetch descriptor; a separate 32-bit word describes the state of the prefetch queues. The control register holds the values of the programmer- or compiler-supplied software pipeline depth and the completion and startup thresholds. The expiration field is reserved for a timeout value, so that an application can specify the maximum time that is allowed to elapse between the time an element is added to an empty queue and a result should be processed. Control bits allow the system to specify the handling of timer expiration events, which may include forcing completion at the next request or generating a hardware exception. The prefetch target descriptor is used by the application to indicate the location of the prefetch targets relative to the prefetch address. In order to support prefetching of selected fields within a given data structure, the architecture supports selected prefetching of memory locations on a word basis within an address range. Two interpretations of the prefetch target descriptor are available, depending on the value of the mode bit, M: A bit value of 1 at offset w in the word mask indicates that the word at an offset of w words from the specified prefetch address is a prefetch target. For a 4 word (32 byte) line size, the 32 bit word mask makes it possible to efficiently select prefetch targets from among 4 adjacent cache lines with a single prefetch request. The resolution of a single word makes it possible for the prefetch hardware to determine when any multi-word prefetch target falls on one or two cache lines, since prefetch addresses need not be aligned on cache line boundaries. For instance, a prefetch target with an address $A_0$ and a word mask of 0xA0000000. The word mask indicates that the first two words following $A_0$ are to be prefetched. A single cache line prefetch is required when $A_0$modulo 32=0. However, an address $A_1$, where $A_1$ mod 32=28, requires two cache lines to be prefetched. Alternatively, each of four 8-bit fields specifies a word offset and a word count of 4 bits each. This makes it possible to specify prefetch targets at four separate offsets from the prefetch base address of up to 16 words each, assuming offsets are cumulative. Other combinations are possible. Additional options require adding bits to the mode field. This flexibility in specifying a prefetch target makes it possible to address the situation where multiple data fields used by the application to process each node fall onto different cache lines, and the data fields do not share a cache line with the key field used to traverse the data structure.

The application writes request tuplets to the accumulation queue port, represented by register A of FIG. 17. Once all components of the request tuplet have been received, the request is enqueued on the accumulation queue. Completed requests may be stored on a hardware result queue. If any completed requests occupy the result queue, then the runtime system dequeues one each time a new request is submitted, thus ensuring that the result queue never overflows. Similar to its software counterpart, the hardware result queue indicates that no request is available on the result queue by placing a special value in the result extraction register, X. Each of the hardware queues behaves similar to its software analog. An update of the next address register, N, updates the prefetch address field of the active request and places it on the prefetch issued queue. Enqueuing a result causes a request to be moved from the accumulation queue to the issued queue. The prefetch address generator dequeues the head of the issued queue. Based on the prefetch target descriptor, it then generates a sequence of prefetch operations. The request is immediately placed on the prefetch issued queue, rather than waiting for prefetch address generation to complete for the request. In this manner, the application partially hides the latency when the number of available requests to be processed falls beneath the minimum software pipeline depth. I found that this eliminated up to 16% of the read stall cycles in some instances.

The application has the option of placing the result in the result queue via the result register, R. The result queue is present to allow the application to maintain software pipeline semantics. The presence of the result queue does not prevent the application from processing a result immediately, in which case it may be neither necessary, nor desirable, to add the result to the result queue. A system library provides the necessary interfaces to the prefetch unit. Table2 provides an overview of the interface macros provided to support temporal restructuring in hardware.

TABLE 2

| | |
|---|---|
| accumulate | writes the request to the accumulation queue port. A NULL request indicates to the prefetch unit that the pipeline is to be forced. |
| iterate | returns the prefetch address of the active request register. |
| result | moves the active request to the result queue. |
| replace | replaces the prefetch address in the active request field and moves the active request to the prefetch issued queue. |
| key | returns the search key value of the active request. |
| request | returns the request id of the the active request |
| extract | returns the request at the head of the result queue. |

Having described and illustrated the principles of the invention in a preferred embodiment thereof, it should be apparent that the invention can be modified in arrangement and detail without departing from such principles. I claim all modifications and variations coming within the spirit and scope of the following claims.

I claim:

[1. A method of scheduling units of work for execution on a computer system including a data cache or data cache hierarchy, the method comprising the steps of:

buffering a plurality of transactions on a data structure;

scheduling a plurality of said transactions on said data structures in a loop;

issuing prefetch instructions within the body of said loop for the data required to process said transactions.]

[2. The method of buffering the results of the transactions processed on a computer system in accordance with claim 1, wherein the results are buffered as well, thereby allowing multiple results to be processed together at a later time.]

[3. The method of processing the results of a completed traversal on a data structure on a computer system according to claim 1 once a traversal of the data structure has completed.]

[4. The method of associating a request identifier with each transaction on a data structure represented on a computer system according to claim 1 so as to process requests at a time when the number of buffered transactions has reached a threshold at which software pipelined prefetching across the accumulated set of transactions can be applied in sufficient number so that the cumulative gains outweigh the inherent overhead of the method.]

[5. The method of associating a prefetch descriptor with each data structure that describes the invariants across buffered requests on a computer system according to claim 1, where the invariants include the pipeline depth (D), the startup threshold (K), and the optional completion threshold (Z), optionally the size of the prefetch target at each request, and optionally a small buffer for application specific data.]

[6. The method of initiating execution of the software pipeline loop on a computer system according to claim 1 once the number of accumulated requests has reached a startup threshold (K).]

[7. The method of allowing a computer system according to claim 6 to proceed with processing any buffered transactions before the startup threshold (K) has been reached.]

[8. The method of exiting the software pipeline on a computer system according to claim 1 when the number of unprocessed transactions buffered according to claim 1 reaches a completion threshold (Z).]

[9. The method of buffering the transaction results on a computer system according to claim 1 whereby a completed transaction is swapped with a transaction that has not yet completed, thereby eliminating the need for additional buffer space.]

[10. The method of buffering the transaction results on a computer system according to claim 1 whereby the completed transactions are maintained in a FIFO.]

[11. The method of selecting the next node to prefetch in the software pipeline executing on a computer system according to claim 1 whereby a transactions is selected from the set of buffered transactions if a transaction on the given data structure has been completed, and the next traversal node in the data structure is prefetched otherwise.]

[12. The method of forcing the completion of the requests buffered in a computer system according to claim 1, thereby ensuring that the time required to complete any buffered transaction can be bounded, and allowing the computer system to complete buffered traversal requests when it might otherwise be idle.]

13. A computer system [with a cache hierarchy] comprising:

a) at least one main memory, b) at least one cache coupled to *the at least one* main memory, c) [a] means for prefetching data into any such *of the at least one* cache from *the at least one* main memory, d) a buffer [for accumulating] *configured to accumulate* traversal requests, e) a buffer [for storing] *configured to store* traversal results, f) [a] means [of] *for* storing *the* traversal requests once prefetch operations have been initiated, g) a buffer [for holding] *configured to hold* an active traversal request, *and* h) a multiplexor *configured* to select between [the] accumulated [traversals] *traversal requests* and the active traversal *request*.

14. [A cache memory] *The computer* system according to claim 13 wherein a prefetch control word is maintained which describes [the] *a* prefetch target in terms of *a* software pipeline depth, *a* completion threshold, *a* startup threshold, a real-time timeout value, a sequence of control bits that specify [the] handling of timer events, a prefetch target descriptor, said prefetch target descriptor providing a description to [the] *a* prefetch unit of [the] *a* number and [stride] *a size* of words to be prefetched relative to the prefetch target specified as part of [the] *a* traversal request when a plurality of cache lines to be prefetched are associated with each prefetch target address, and a mode field that distinguishes between different interpretations of [the] prefetch target descriptor fields.

15. [A cache memory] *The computer* system according to claim 13 [wherein], *further comprising* a buffer [is used] *configured* to store a representation of traversal requests for which an associated prefetch request has been issued.

16. [A cache memory] *The computer* system according to claim 15 wherein said buffer *configured to store a representation of traversal requests for which an associated prefetch request has been issued* is implemented as a queue.

17. [A cache memory] *The computer* system according to claim 13 wherein [the] *a* traversal request is represented by *at least one of* an address [or] *identifier, a* request identifier, an application supplied value [such as a key], and [the] *an* address of a node in [the] *a* data structure to be traversed.

18. [A cache memory] *The computer* system according to claim 13 [wherein a], *further comprising an active request* buffer [holds the] *configured to hold a* traversal request for which a data structure traversal is in progress.

19. [A cache memory] *The computer* system according to claim 18 [including] *further comprising:*

[a] means [of] *for* reading [the] contents of subfields of said *active request* buffer[.]*;*

[a] means [of] *for* storing and extracting *the* subfields of said *active request* buffer.

20. [A cache memory] *The computer* system according to claim 18 [wherein] *further comprising;* a [next] *device* register (N) [is provided whereby], *wherein* writing to said device register causes [the] *an* active traversal request address field to be updated with [the] *a* value written to said device register, the active traversal request to be added to [the] *a* prefetch issued queue, and a prefetch issued for the device *register* according to [the] specifications of [the] *a* prefetch control register.

21. [A cache memory] *The computer* system according to claim 18 *further comprising:*

[wherein] a result register (R) [is provided where], *wherein* upon [to] said *result* register being updated:

[the] *an* active traversal request address field is updated to [the] *a* value written to said [device] *result* register;

if an active results buffer is employed, the active traversal request is added to the [results] buffer *configured to store the traversal results*;

a traversal request from the [accumulation] buffer *configured to accumulate the traversal requests is* added to [the] *a* prefetch issued queue, and a prefetch *is* issued for [the] *a* prefetch address specified by [the] *a* prefetch issued buffer.

22. [A cache memory] *The computer* system according to claim 18 [wherein] *further comprising* a current register (C) [is] associated with [the] *a* prefetch issued queue, *wherein* reading said *current* register [triggers] causes [the] *a* head of the prefetch issued queue to be dequeued into the active request buffer.

23. [A cache memory] *The computer* system according to claim 13 [wherein], *further comprising* a *completion* buffer [stores] *configured to store* completed data structure traversal requests.

24. [A cache memory] *The computer* system according to claim 23, [which provides a] *further comprising* means [of] *for* removing a traversal request from said *completion* buffer.

25. [A cache memory] *The computer* system according to claim 13, wherein access to any of said buffers is provided by means [of] *for* memory mapped device interfaces.

[26. The method of organizing data within the memory on a computer system, the method comprising the steps of:

a) determining the cache line boundaries of data structure elements;

b) aligning the base of the data structure on a cache line boundary;

c) homogenizing the data structure;

d) inserting a pad field into data structure elements so that subsequent elements are aligned on cache line boundaries;

e) packing elements so as to maximize the data represented in each cache line by removing pointers to adjacent elements, whereby the program instructions that traverse the data structure are constructed to traverse the adjacent packed elements before traversing non-packed elements, whereby steps b, c, d, and e may be performed in any order and any proper subset of steps c, d, and e can be employed.]

[27. The method of creating a homogeneous hash table according to claim 26 whereby the hash function directly indexes an array of nodes in the hash chain, rather than an array of pointers to hash chain nodes, thereby decreasing the number of memory references required to traverse the hash bucket chain, and therefore potential data cache misses, by one.]

[28. The method of creating a graph represented as adjacency lists according to claim 26 whereby the nodes in the adjacency list are aligned on cache line boundaries, padded, and packed.]

*29. In a data processing system, a method for restructuring data requests, comprising:*

*receiving the data requests directed to a data structure having a dynamically determined traversal path between data elements, wherein each data request of the data requests is independent of any other data request of the data requests, and wherein the data requests are temporally scattered;*

*storing the data requests in an accumulation queue;*

*searching, in response to satisfaction of a search trigger criterion, the data structure for data requested by the data requests stored in the accumulation queue, wherein the search trigger criterion is satisfied at a time other than a time of the storing the data requests and wherein the searching includes issuing prefetch requests for at least a portion of the data requested by the data requests stored in the accumulation queue;*

*determining if a results queue of the data processing system is empty, wherein the results queue is configured to store at least a result of a data request of the data requests;*

*forcing a processing of the data request if the results queue is empty;*

*storing, in the result queue, results of the prefetch requests; and*

*deferring a further processing of the stored results, by a requesting process of the data processing system, until a threshold number of stored results is stored in the results queue, wherein the requesting process is configured to issue temporally scattered independent data requests.*

*30. The method of claim 29, wherein the data structure comprises at least one of a binary tree and a hash table, and wherein receiving the data requests comprises at least one of receiving requests to search for data nodes in the binary tree and receiving requests to search for bucket chains of the hash table.*

*31. The method of claim 29, further comprising:*

*storing, in the result queue, found data if, as a result of the searching the data structure, the requested data are found in the data structure, and*

*storing, in the result queue, an indication that the requested data are other than present if, as a result of the searching the data structure, the requested data are other than present in the data structure.*

*32. The method of claim 29, further comprising:*

*storing, in the result queue, a request of the prefetch requests; and*

*storing, in the result queue, a result of the request stored in the result queue, wherein the request stored in the result queue and the result of the requests stored in the result queue are uniquely associated in the result queue, a resulting process of the data processing system is configured to search within the result queue for the request stored in the result queue to obtain the result of the stored result, and the resulting process is configured to issue temporally scattered independent data requests.*

*33. The method of claim 32, further comprising:*

*issuing, via the requesting process, a first data request at a first time, wherein the first data request and a result of the first data request are associated in the results queue;*

*issuing, via the requesting process, a second data request at a second time, wherein the second time is later than the first time; and*

*matching the second data request to the first data request stored in the results queue, wherein the stored result of the first data request is returned from the results queue in response to the second data request.*

*34. The method of claim 33, wherein the second data request comprises a time-deferred processing of the first data request.*

*35. The method of claim 29, further comprising:*

*storing, in the result queue, found data if, as a result of the searching the data structure, the requested data are found in the data structure; and*

*determining if the stored found data requires a modification.*

*36. The method of claim 35, further comprising:*

*deferring the modification of the stored found data in the data structure until the stored found data are not stored in the result queue.*

*37. The method of claim 29, further comprising:*

*storing the prefetch requests in a prefetch queue; and*

*tracking pending prefetch requests to ensure that at most one prefetch is stored pertaining to any one unique element of the data structure.*

*38. The method of claim 29, further comprising forcing a processing of any pending data request in the accumulation queue if the results queue is empty.*

*39. The method of claim 29, wherein the data structure comprises a binary tree and further comprising:*

*determining that a node of the binary tree excludes a data value requested by a data request;*

*determining that the node has a pointer to a child element; and*

*queuing a request to search a child node, wherein the request is queued in at least one of the accumulation queue or a prefetch queue.*

*40. The method of claim 29, wherein the data structure comprises a hash table and further comprising at least one of the homogenizing the hash table and aligning a bucket of the hash table on a cache boundary.*

*41. The method of claim 29, further comprising implementing the accumulation queue in a hardware register.*

*42. The method of claim 29, further comprising;*

*implementing at least one of the accumulation queue, a prefetch queue, and the results queue in a hardware register.*

*43. The method of claim 29, wherein the searching comprises searching the data structure for the data requested by the data requests stored in the accumulation queue when a threshold time delay has been exceeded.*

*44. The method of claim 43, wherein the threshold time delay is set based on a system response time requirement.*

*45. The method of claim 43, wherein the threshold time delay is based on at least one of:*

*a maximum permissible delay time before a search is processed; and*

*an average frequency at which search requests are received.*

*46. The method of claim 29, wherein the receiving comprises receiving the data requests issued by a transaction processing system.*

*47. The method of claim 29, wherein the receiving comprises receiving the data requests issued by an operating system.*

*48. The method of claim 29, whereon the receiving comprises receiving the data requests issued by a database management system for searches of a database.*

*49. In a data processing system, a method, comprising:*

*receiving the data requests directed to a data structure configured to store, in a memory, data elements which are spatially decoherent, wherein a traversal path to a first data element in the data structure is contingent upon at least one value stored in a second data element of the data structure, wherein each data request of the data requests is independent of any other request of the data requests, and wherein the data requests are spatially scattered in the memory;*

*storing the data requests in an accumulation queue;*

*searching, responsive to satisfaction of a search trigger criterion, the data structure for data requested by the data requests stored in the accumulation queue, wherein the search trigger criterion is satisfied at a time other than a time of the storing the data request and wherein the searching includes issuing prefetch requests for at least a portion of the data requested by the data requests stored in the accumulation queue;*

*determining if a results queue of the data processing system is empty, wherein the results queue is configured to store at least a result of a data request of the data requests;*

*storing, in the result queue, results of the prefetch requests;*

*forcing a processing of the data request if the results queue is empty; and*

*deferring a further processing of the stored results, by a requesting process of the data processing system, until a threshold number of stored results is stored in the results queue, wherein the requesting process is configured to issue temporally scattered independent data requests.*

* * * * *